United States Patent
Tinebor

(10) Patent No.: US 7,723,940 B2
(45) Date of Patent: May 25, 2010

(54) NON-REDUNDANT SAFETY MONITORING FOR AN ELECTRIC DRIVE MECHANISM (WITH A SENSOR)

(75) Inventor: Manfred Tinebor, Barntrup (DE)

(73) Assignee: Lenze Automation GmbH, Meerbusch (DE)

( * ) Notice: Subject to any disclaimer, the term of this patent is extended or adjusted under 35 U.S.C. 154(b) by 557 days.

(21) Appl. No.: 10/544,931

(22) PCT Filed: Feb. 10, 2004

(86) PCT No.: PCT/DE2004/000240

§ 371 (c)(1),
(2), (4) Date: Feb. 23, 2006

(87) PCT Pub. No.: WO2004/070924

PCT Pub. Date: Aug. 19, 2004

(65) Prior Publication Data

US 2006/0186891 A1    Aug. 24, 2006

(30) Foreign Application Priority Data

Feb. 10, 2003  (DE) .............................. 103 05 337

(51) Int. Cl.
G05B 23/02 (2006.01)
(52) U.S. Cl. .................................................. 318/565
(58) Field of Classification Search ................ 318/560, 318/563, 565, 568.24, 568.16, 700, 711, 318/714, 715; 324/527, 523
See application file for complete search history.

(56) References Cited

U.S. PATENT DOCUMENTS

| | | | | |
|---|---|---|---|---|
| 5,635,810 A | * | 6/1997 | Goel | ........................... 318/719 |
| 5,917,297 A | * | 6/1999 | Gerster et al. | ................ 318/366 |
| 6,191,550 B1 | * | 2/2001 | Yoshihara | .................... 318/661 |
| 6,199,422 B1 | | 3/2001 | Boerhout et al. | |
| 6,208,536 B1 | * | 3/2001 | Boesche et al. | ................ 363/37 |
| 6,745,083 B2 | * | 6/2004 | Eckardt et al. | ................. 700/2 |
| 6,822,416 B1 | * | 11/2004 | Kunz et al. | .................. 318/700 |
| 6,832,121 B1 | * | 12/2004 | Albrecht et al. | ............... 700/79 |
| 6,906,492 B2 | * | 6/2005 | Matsushita | .................... 318/727 |
| 6,958,620 B1 | * | 10/2005 | Kozuki | ......................... 324/772 |
| 7,012,399 B2 | * | 3/2006 | Suzuki | ........................ 318/661 |
| 2002/0152039 A1 | * | 10/2002 | Fujimoto et al. | .............. 702/36 |
| 2002/0175645 A1 | | 11/2002 | Fujimoto et al. | |

FOREIGN PATENT DOCUMENTS

EP    0 264 350    10/1987
WO    WO 99/29474    12/1998

OTHER PUBLICATIONS

International Search Report dated Oct. 4, 2004.

* cited by examiner

*Primary Examiner*—Bentsu Ro
*Assistant Examiner*—David S Luo
(74) *Attorney, Agent, or Firm*—Hunton & Williams, LLP

(57) ABSTRACT

The invention relates to a method for detecting undesired operating conditions of a driving device. A sensor (50) that is transformer-coupled between a stator side and a rotor side is triggered by a control circuit (40) for detecting a position value or a rotational speed value of the drive mechanism. An error signal (F) is emitted, if an undesired operating condition occurs. A test signal ($\epsilon$) is supplied to a safety monitoring device (30) in order to determine and emit this error signal (F), said test signal being also supplied to the control circuit (40). There, the test signal ($\epsilon$) acts as an unbalance and is checked as regards its presence in the safety monitoring device.

13 Claims, 4 Drawing Sheets

NON-REDUNDANT SAFETY MONITORING FOR AN ELECTRIC DRIVE MECHANISM (WITH A SENSOR)

CROSS REFERENCE TO RELATED APPLICATIONS

This application is a U.S. National Stage Application of International Application No. PCT/DE04/00240, filed Feb. 10, 2004, which claims the benefit of DE 103 05 337.9, filed on Feb. 10, 2003, the disclosures of which are incorporated by reference herein in their entireties. PCT/DE04/00240 designated the United States and was not published in English.

FIELD OF THE DISCLOSURE

The invention relates to a process for monitoring a drive mechanism that is in particular electrically driven and customarily consists of a driving motor, a shaft and an output coupled to the shaft. At least one measuring signal, mostly also several measuring signals, is and/or are required in such drive mechanisms, which are customarily designated as rotational speed, acceleration and position (or angle of rotation) in drive technology.

The invention relates both to a process for detecting an undesired operating condition and to a sensor that is secured against failure. Preferably, this sensor is a synchro resolver, which is customarily designated as resolver in drive technology. The resolver is a transformer-coupled sensor that emits a use signal from which at least one system signal relevant for drive technology can be determined.

BACKGROUND OF THE DISCLOSURE

As regards the technical functional principle the synchro resolver is a rotating (magnetic) transformer whose output voltage is in an unequivocal relationship with the position of its shaft. For this reason, synchro resolvers are suited as absolute angle transmitters with an angular range of more than 360°, cf. in this connection e.g. DE-C-196 35 040 (Litton), column 1, lines 15 to 20 and column 2, lines 9 to 13. While the referenced publication relates to the merely mechanical construction of the synchro resolver, cf. FIG. 2 thereof, the determination of the desired system magnitudes is also possible with DE-C 38 34 384 (Lenze). The latter publication describes a process and a circuit arrangement for generating digitized rotational speeds and information on angles of rotation by means of a synchro resolver. In this connection reference is made to FIG. 1 thereof. It shows a control circuit as a servo controller, with which an operating signal of the rotor winding of the resolver is supplied to the circuit arrangement which controls the actuating variable to zero with a controller. Then, the output of the controller corresponds to the rotational speed in the stationary state and its integral corresponds to the position (called "angular output" there).

In particular, in the case of a rough environment, but also during long-term use, it must be ensured that the drives do not adopt any inadmissible operating conditions, i.e. that they do not experience any rotational speeds that are too high, if e.g. the measuring element for the measurement of the rotational speed fails such as due to an electrical or mechanical defect in the rotary encoder. Mostly, such problems are solved in the prior art by means of redundancy, namely by the use of several rotary encoders, which, then, allow a safety monitoring within the framework of a comparative measurement or a voter-basis decision (at least in the case of three sensors).

Some embodiments allow non-redundant safety, and provide this safety for operating signals in drive technology. No additional sensors for said operating signals are to be added and, nevertheless, a safety-oriented limitation of the rotational speed of a drive is provided to obtain high levels of protection.

SUMMARY OF THE INVENTION

According to an embodiment of the invention, a sensor is of a reliable safety providing the generation of an error signal via a monitoring circuit possible, a non-admissible operating condition being detected and the error signal being accordingly generated.

The process is used in the general field of drive technology, alternatively a sensor according to the same claim, an unbalance signal being used which is fed to the closed control loop of the sensor. This continuous feeding of the unbalance signal can be detected outside the measuring loop in a separate monitoring circuit, where its presence is monitored and the error signal is accordingly emitted if this unbalance signal—called control signal in the monitoring circuit—fails to appear. The output signal of the sensor is also supplied to the monitoring circuit, which is supplied to the closed control circuit in the same fashion, this operating signal being, however, part of the closed control loop. Only the monitoring circuit is outside the closed control loop and is not included in the ascertaining of the automatic control signal with its output signal.

All electric defects of the selsyn and its connecting lead such as interruption or short circuit are detected with this special monitoring and the error signal is accordingly generated.

The monitoring circuit assumes the recognition of the failure, a test signal being fed near the servo control circuit of the circuit arrangement of the synchro resolver in the case of the use of a transformer-coupled sensor in the sense of the "synchro resolver". The insertion of the test signal can take place in particular at the place of the deviation, i.e. before the controller of the servo circuit that has at least one integral portion. Thus, this test signal influences the entire control circuit and, figuratively speaking, represents an unbalance, if one proceeds from the assumption that, in the stationary condition, a deviation of zero is present at the input of the controller of the circuit arrangement. This stationary deviation is still present, it is only influenced by the feeding of the test signal which, in turn is supplied to the monitoring circuit in the same fashion (with the same amplitude).

If there is a failure of the synchro resolver, the safety monitoring can recognize that a control signal of zero is not obtained, if the unbalance signal is subtracted. This allows the conclusion that there is an electrical or mechanical defect of the sensor, which results in a safety shutdown, which is caused at a low voltage level. The presence of the test signal is continuously monitored in the safety monitoring device. In this connection, the test signal may be substantially constant. It may be fed as an angular signal, specifically at the aforementioned place of the deviation of the integral controller of the servo control.

Not only the test signal is fed both to the safety monitoring device and to the servo control, but the output signal (operating signal) of the resolver is fed thereto, as well.

Examples of failures to be recognized are a limit rotational speed monitoring (claim 7).

The determination of the rotational speed value or the position value in the servo control takes place as explained in the prior art section Since the test signal is first of all filtered out from the modulated operating signal of the synchro resolver in the safety monitoring device and no special demodulation in the safety monitoring device must be carried out for this purpose as it is carried out in servo control by means of a carrier frequency, the high frequency portion of the operating signal can be filtered out by means of a simple circuit technology. In this connection reference must be made to the fact that the functionality which is used in the initial portion of servo control and that used in safety monitoring device should be comparable.

The control signal obtained by the functionally equal influencing by the signal should essentially correspond to the test signal in the normal condition of the drive as regards the absolute value so that a subtractive combination (in the sense of a comparison of the absolute-value variables) results in a result of zero.

If there is a deviation that is longer in terms of time or higher in terms of the absolute value, the error signal can be generated. In order to detect error signals on a not too sensitive basis, a tolerance range may be provided, e.g. by means of a window comparator. There may also be a time-out, before the error signal is activated.

It must be noted that the error signals to be detected are not such signals which can be "detected by means of control engineering and adjusted". Such disturbing influences that can be detected in this fashion should be detected by the regular control, whereas the "disturbance variables" in the sense of safety-relevant failures which cannot be influenced by this control are separately detected by the safety monitoring device.

In order to keep the influence by the test signal deterministic, this signal should be at least continuous, in particular formed as a constant value. It is certainly fed into the control circuit, but, if its magnitude is known, it can be taken into account in the actual control. Since it is deterministic and its amplitude is known, it can also be subtractively combined in the safety monitoring device, the safety monitoring device separately determining this test signal as an unbalance of the deviation of the servo controller in the sense of a control signal.

The modulation signal used in the servo control (the control circuit) may be in the range of 4 to 6 kHz, in particular as a sinusoidal signal in order to obtain a higher resolution due to a sampling of the shape of this signal and/or the wave shape. Within one sinusoidal oscillation sampling is e.g. carried out 8 times, which is in particular of advantage in the case of slow rotational speeds.

The use of the unbalance signal (also: test signal) for recognizing short circuits in the connecting leads, the connecting points or the winding of the sensor is advantageous. An interruption could at best be detected with an impressed one-polarity signal (Gleichsignal) in the sensor which does not have any influence on the measuring variable due to the transformer coupling, but not a short circuit which would leave the DC current signal at the sensor practically unchanged. The most frequent causes of trouble are defective cables and connections, which can be recognized with the invention irrespective of the type of the defect associated with the sensor.

The invention provides safety without additional redundance of rotary transducers. Accordingly, just one such safety-monitored sensor, e.g. as a synchro resolver, may be used for a drive application. The use of further such sensors is not excluded, if this is required by the field of application.

The safety monitoring device first of all covers the rotary transducer itself, however, with the monitoring of this rotary transducer, the safety of the drive as a whole and of the object driven by the drive is also monitored. Monitoring is effected on a low potential level, i.e. close to the control voltage, not on the power side.

According to the invention costs can be reduced by saving further redundant transducers. Assembly expenditure can be avoided and, nevertheless, safety can be obtained.

Examples explain and supplement the invention.

DETAILED DESCRIPTION OF THE DISCLOSURE

The following description is intended to convey a thorough understanding of the embodiments described by providing a number of specific embodiments and details involving non-redundant safety monitoring of a sensor for an electric drive. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 2:
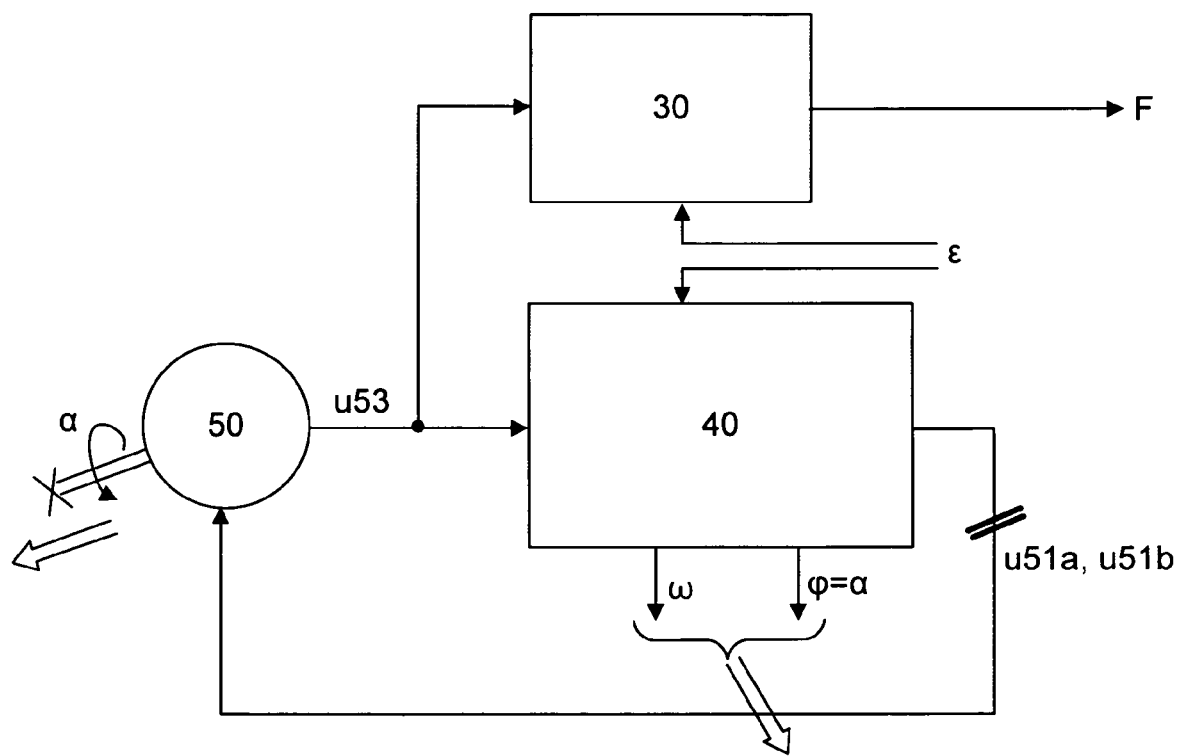
FIG. 2 illustrates an overview diagram to explain the test signal $\epsilon$.

FIG. 2 illustrates a schematic overview of the functional units of the safety monitoring device described here. A synchro resolver (resolver) 50 is used as a sensor, which is coupled to the shaft of the drive. The synchro resolver comprises transformer-coupled windings, one of which co-rotates with the shaft, whereas the two other windings are associated to the stator and are supplied with two alternating signals by a control circuit 40. The phase position of these alternating signals is to correspond to the position and/or the rotary position $\alpha$ of the drive. For this purpose, the servo control 40 is provided with an integrator as a controller, which adjusts an actuating variable to zero, which condition stipulates that the phase position of the signal at the output of the servo control corresponds to the position of the drive.

Thus, a closed control loop is characterized with the functional units 40, 50. The operating signal $u_{53}$ of the resolver, i.e. the signal induced on the rotor winding is also fed to a safety monitoring device 30 from the control loop, whose innards will be explained below by means of FIG. 1. This safety monitoring device emits an error signal F which characterizes a condition which should not occur during normal operation of the drive. It may characterize a failure of the mechanical or electrical parts of the synchro resolver, it may also register an excessive rotational speed and result in a switching off.

An unbalance signal in the sense of a separate, substantially stationary signal $\epsilon$ is supplied both to the control circuit 40 with the servo control and to the safety monitoring device 30. Thus, this signal is fed to the control loop, on the one hand, and, on the other, it is also used outside the control loop in a known amount. This equality of the signals can be used for using the unbalance signal $\epsilon$ as a comparative signal (test signal) which is compared with a control signal derived from the useful signal $u_{53}$ (as operating signal of the resolver 50) in the monitoring circuit 30.

Figure 1:
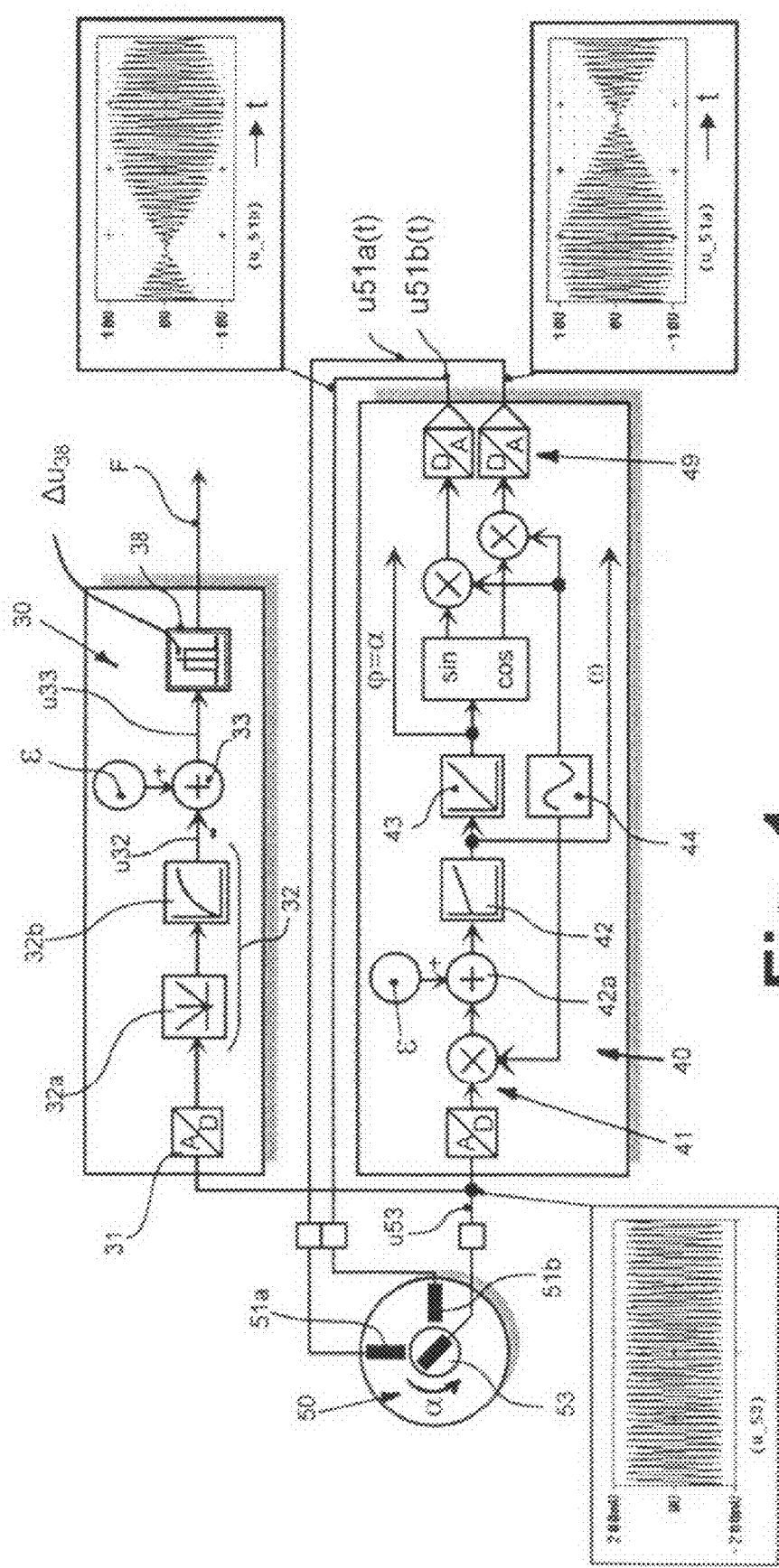
FIG. 1 illustrates a block diagram of a first example.

The more detailed embodiment is shown in FIG. 1. Here, as well, the described functions are found again, only in a specific implementation. The implementation can either be analog or digital in circuit technology. The corresponding components can be implemented discretely or through microprocessor technology. Custom-designed components may also be used, on which analog-to-digital converters are placed, tables for reading out a sinusoidal curve are deposited and the corresponding control algorithms are carried out in sampling control.

Proceeding from the schematically represented selsyn 50 with its rotating rotor winding 53 and the operating signal $u_{53}$ emitted by it this signal is supplied both to the control circuit 40 and the monitoring circuit 30. The two stator windings 51a, 51b that do not have the same orientation (are staggered with respect to each other) are fed by an output stage 49, which makes two phase-shifted signals available. Here, they are designated as cosine and sine, if two windings are provided in the selsyn 50.

A servo controller 42 is provided as a PI controller in the servo control. It has at least one integral-action component in order to provide for a deviation of zero. This deviation results from the physics of the resolver as a first approximation to the difference of the phase positions α and ϕ, more accurately as the sine of this difference. If the deviation can be controlled to zero, the angle α corresponds to the angle ϕ. Thus, the position determination of the drive is possible. A rotational speed designated as ω(t) is measured upstream of an angular integrator 43. In the measuring principle chosen here, the position results from an integration of the rotational speed.

Proceeding from the rotational position ω(t) two oscillation curves $u_{51a}(t)$ and $u_{51b}(t)$ that are phase shifted by 90° can first of all be formed in a digital and then in an analog fashion by means of tables, which form the control signals for the two stator windings 51a, 51b.

Both the output portion of the control circuit, called actuating portion 49, and the input portion 41 of the circuit arrangement 40 use a carrier frequency signal emitted by a generator 44. This signal serves for demodulation in the input portion, whereas it is used for modulating the two phase-shifted output signals in the output portion. A sinusoidal oscillation is used as the carrier frequency, which enables an increased resolution of the position signal of up to 21 bits, instead of substantially 16 bits as has been the case so far, if a digital carrier frequency signal is used. With the modulation in the output portion (before the a-d converters) a resolution of the output signal $u_{53}$ of the sensor can also be made possible in the case of slow rotational speeds up to a standstill. The modulation provides for a transformer-induced signal transmission even if there is no relative movement of the three windings (two in the stator, one in the rotor). Different numbers of windings (e.g. three windings in the stator as a three-phase system) can also be used.

A test signal ε, which was explained above, interferes with the control loop. This test signal is inserted before the at least one integrator 42, 43, in this case at the actuating variable in such a way that the actuating variable is unbalanced and/or adjusted. An influence at this point results in that the servo controller still sets the value zero for the stationary condition at the now changed actuating variable. The dynamics of the system is not influenced by this, only a change in the position measurement takes place. This change in position due to the interference of the test angle ε as a stationary signal can be detected in the safety monitoring device 30. For this purpose, the operating signal $u_{53}$ is supplied to the safety monitoring device. An a-d conversion 31 takes place. After this, the signal is filtered, the filter 32 consisting in the example of an absolute-value generation 32a and a low pass 32b. The low pass 32b filters out the high-frequency portions, which are taken out by the demodulation in the input portion 41 of the control arrangement 40 and/or inserted by the modulation in the actuating portion 49 of the circuit arrangement 40 for the purposes indicated above. Due to the absolute-value generation 32 it is ensured that the drive can be safety-monitored in both directions.

After filtering, a control variable results as a control signal $U_{32}$ which is compared with the test signal ε in a comparator circuit 33. The comparison may be a summation (with an opposite sign). In other words, the test signal as the unbalance signal and the control signal are "subtractively combined".

A signal $U_{33}$ results as a differential signal. This signal should amount to substantially zero in the case of the perfect condition of the drive and without failures of the synchro resolver 50. Slight excursions in the case of dynamic actuating operations and slight deviations regarding the amplitude are possible so that an error signal F is detected by means of a window comparator 38 which does not react too sensitively.

This error signal F can either be compared in the amplitude with a span $\Delta u_{38}$, within which it is not generated, e.g. by the window comparator 38. It may also be combined with a timing circuit (not shown) in such a way that an error signal is only actively output if the measured error signal $u_{33}$ is present for a given (minimum) period of time. This operating mode can be considered as a "short-term blocking".

Known drives and outputs are not represented, which a person skilled in the art will analogously supplement so that they are brought into a suitable mechanical connection with the synchro resolver. The actual control with which the drive is driven starting from the rotational variables indicated in FIG. 1 such as the rotational speed or the position, supplementarily possibly also a measured acceleration, is also not represented.

As an example the shape of test signal is represented here as a stationary test angle ε=constant, which influences the control circuit on a long-term basis. It is not adjusted by the actual control of the drive.

It was compared above that the operating signal $u_{53}$ is treated functionally equal in the input portion of the control circuit 40 and in the input portion of the safety monitoring device 30. As regards the result, the actual actuating variable prior to the influencing by the test angle ε, i.e. before the summing point 42a, is zero in the stationary condition. Thus the two input portions are functionally equal even if they are differently designed in terms of circuit technology.

Since the summing point 42a works as a difference generator 33 in the safety monitoring device, it can be recognized that no signal component should be present both at the window comparator 38 (difference signal $u_{33}$) and at the input of the servo controller 42 in the stationary condition. This is different for the undesired operating condition to be detected. It is true that the servo controller will still adjust an actuating variable to zero for a certain period of time, but here, the window comparator already responded and indicates an undesired operating condition through the error signal F, also called F(t), F(t) being 0, if t>$t_F$, with $t_F$ being the point in time of the occurrence of the failure in an example.

This comparison reveals that, independently of the servo control 40, an independent influencing of the operating test signal $u_{53}$ takes place in order to be able to monitor the presence of the test angle to be evaluated as regards the amplitude. The occurrence of an error to be detected results from the lack of compensation in the safety monitoring device 30 which is represented with a time delay or with a certain amplitude tolerance $\Delta u_{38}$ as error signal F(t).

In other words, the output of the error signal F occurs in the case of a deviation and/or if the compensation case is left in the safety monitoring device. The compensation case is the condition with a synchro resolver 50 that is duly connected electrically and mechanically and functions properly. This compensation case must not be a complete compensation of the signals at the subtraction point 33, but may be "substantially a compensation" as this results form the description of the tolerance voltage and the time monitoring prior to a definitive output of the error signal F.

Signal diagrams for the example of embodiment will be explained in the following. They are allocated to three points in the circuit diagram of FIG. 1. The two output signals u51a(t) and u51b(t) are signals with a carrier frequency, which are modulated by the modulator 44. This carrier frequency can only be recognized in outlines in the sampled signal, whereas the envelope represents the rotational frequency of the rotor. These two frequencies are clearly different; the modulation signal used in the servo control may be in the range of 4 to 6 kHz (cf. page 4, last paragraph).

The test signal ϵ that is assumed to be constant in the example is modulated by the carrier frequency of the modulator 44 as signal ϵ' that is small as regards the amplitude and can be recognized at u53, in this example with a small amplitude of less than 200 mV.

Figure 3:
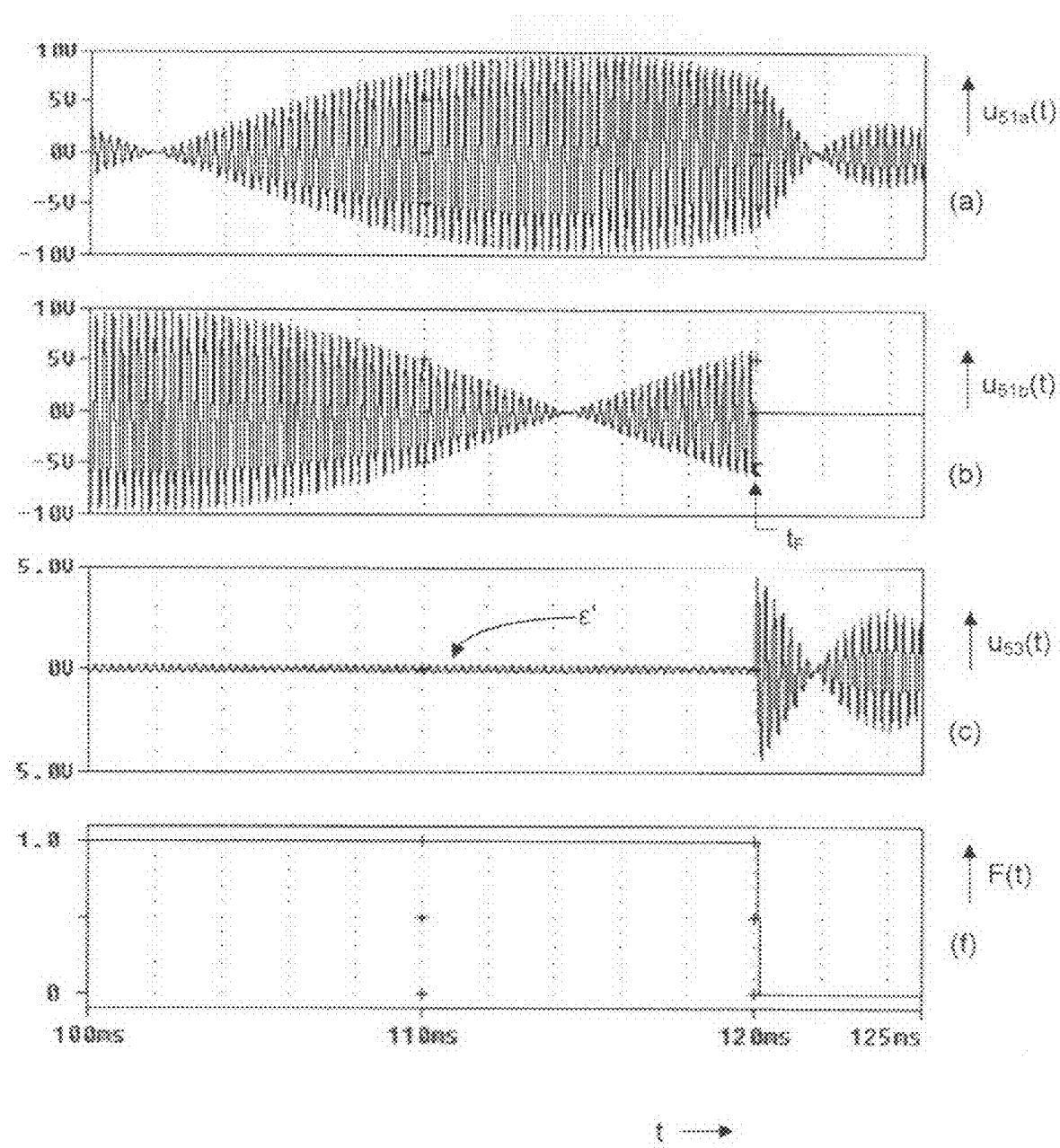
FIG. 3 shows signal waveforms (a) to (f) with the first example for various error conditions that are detected.
Figure 4:
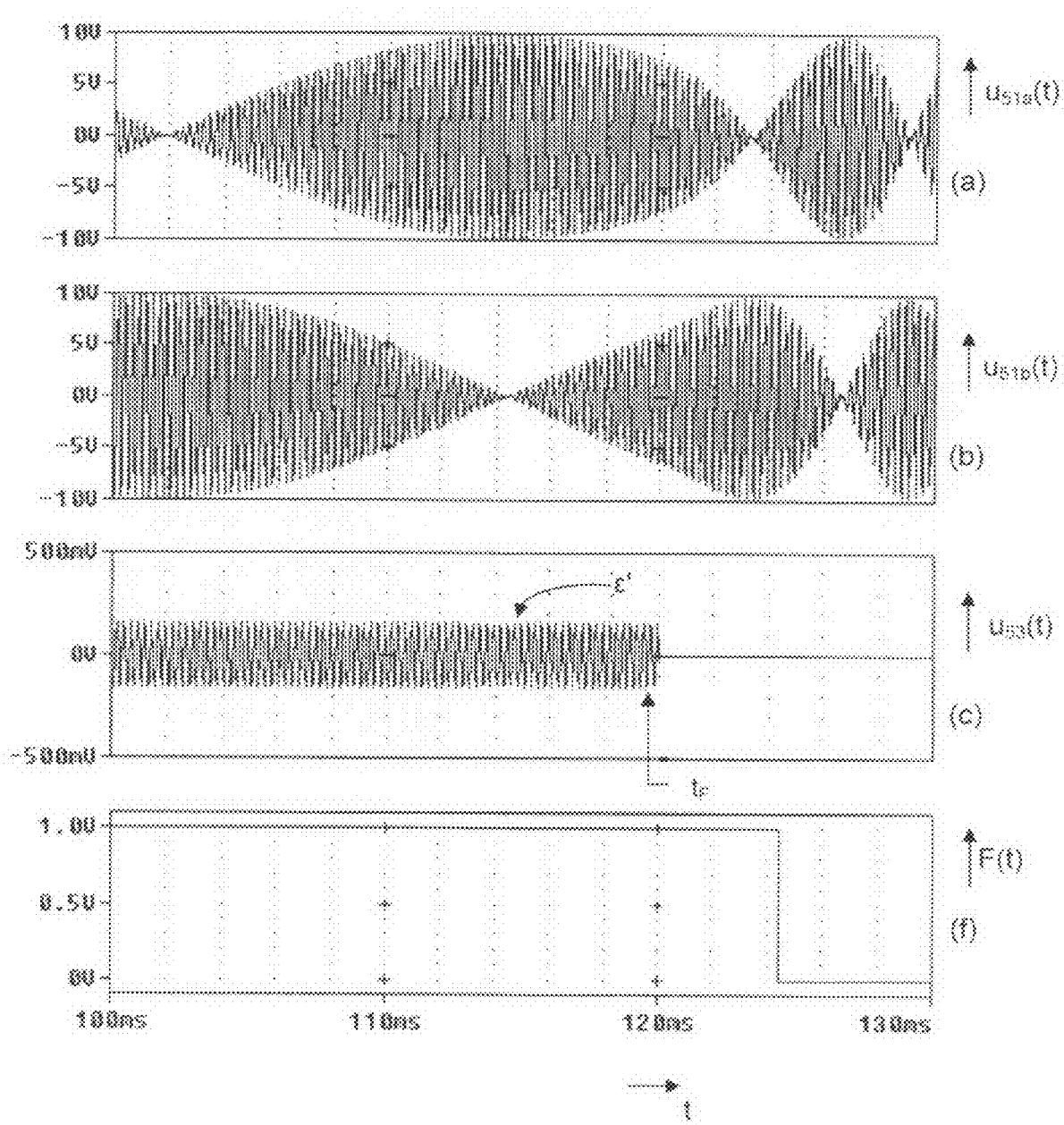
FIG. 4 shows signal waveforms (a) to (f) with the first example for various error conditions that are detected.
Figure 1:
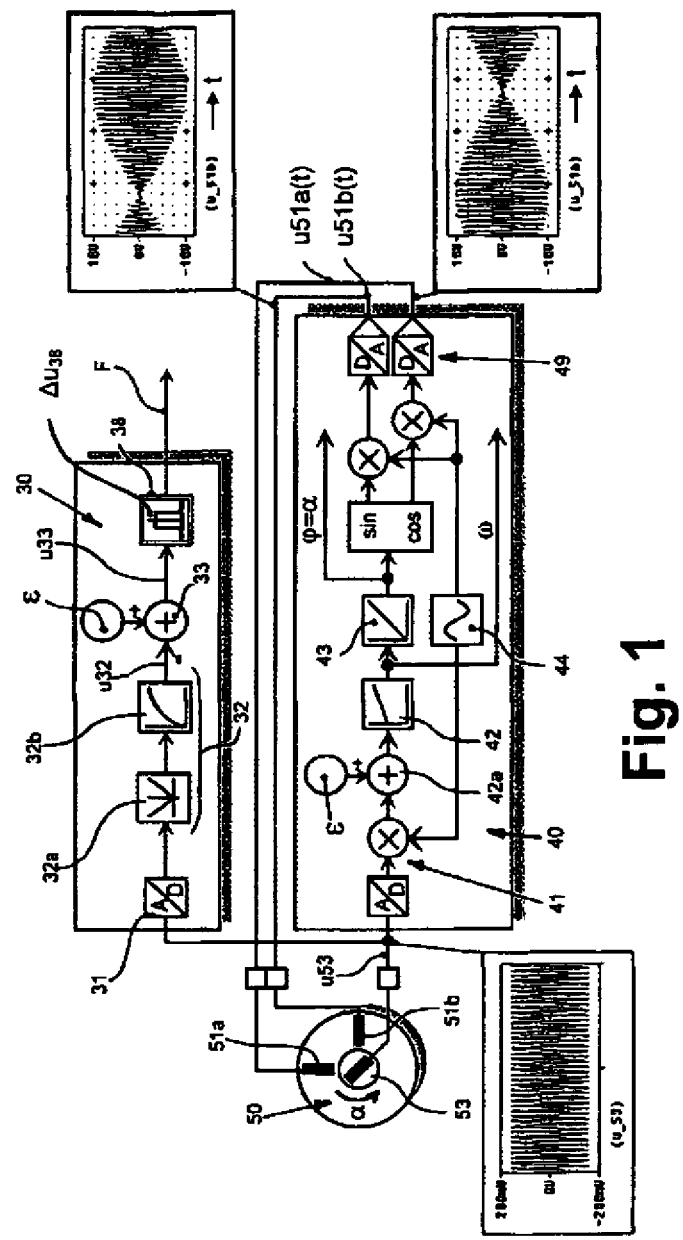
Figure 2:
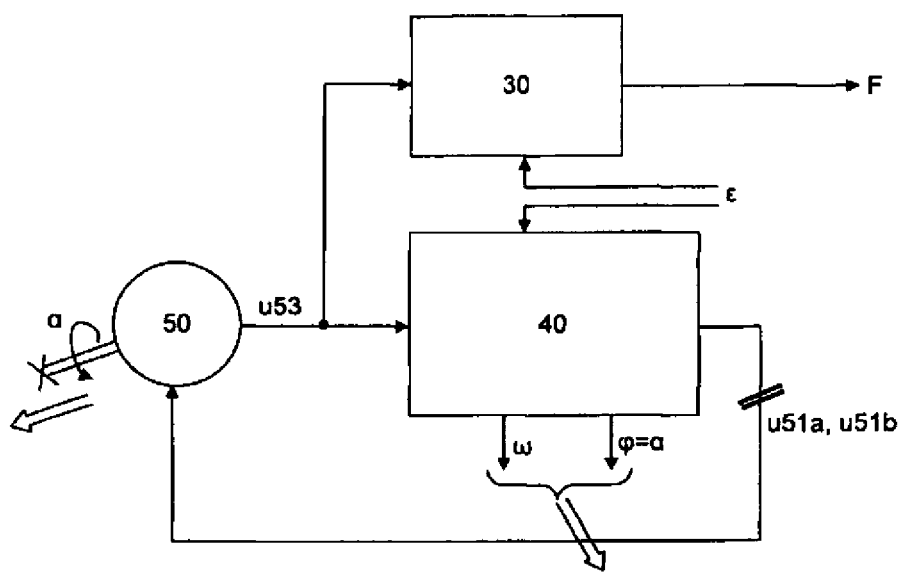
Figure 3:
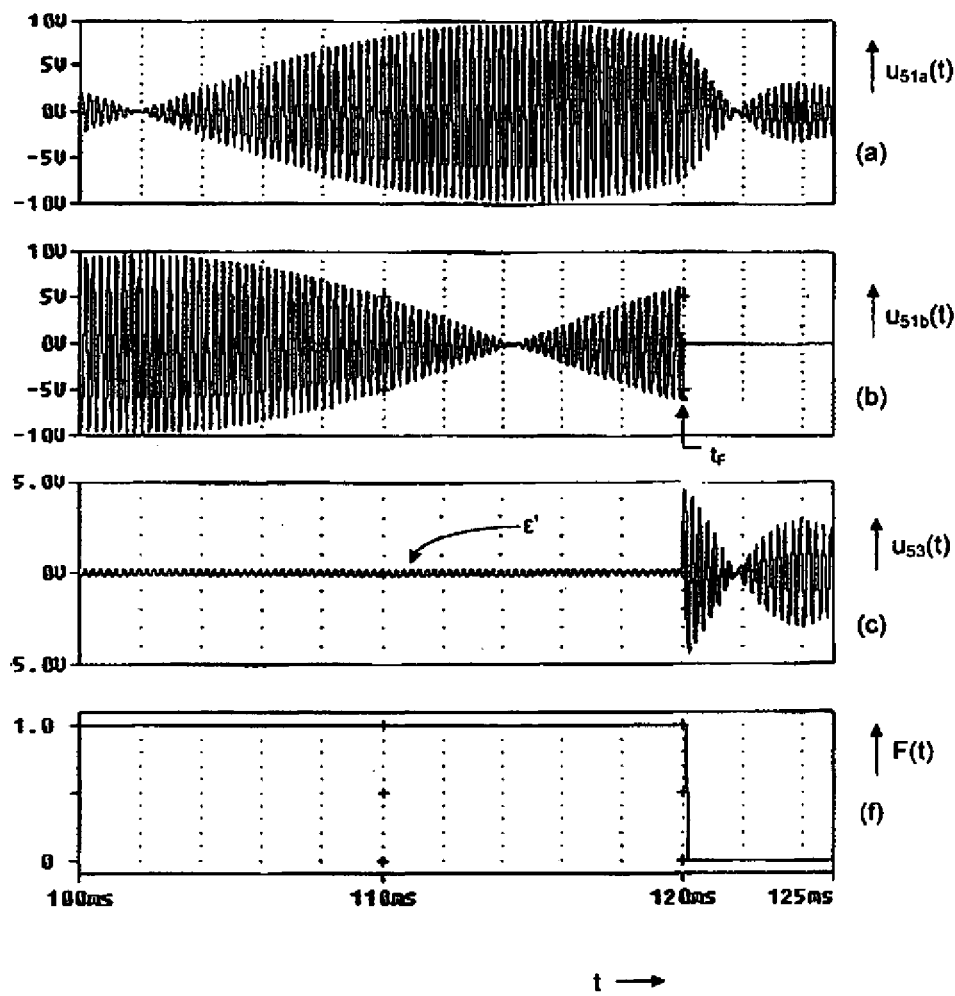
Figure 4:
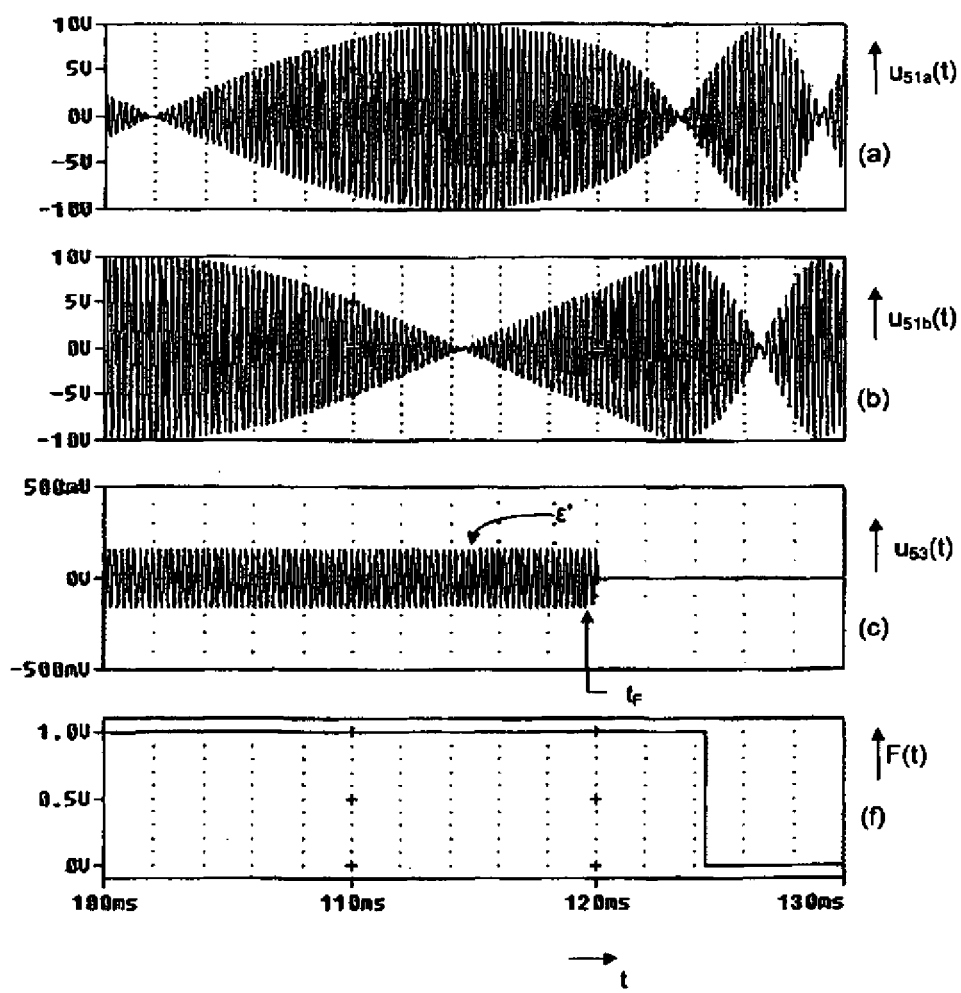

For the occurrence of an error to be assumed, FIGS. 3 and 4 show different errors, once with the stator (FIG. 3) and once with the rotor (FIG. 4). Inasmuch as the rotor is affected, a modification of conductance of the rotor winding 53 is concerned, which occurs due to an interruption or a short circuit at the assumed point in time $t_F$. In the represented example this is the case at the point in time 120 msec. This applies to the two FIGS. 3 and 4. In the case of an interruption of the wiring arrangement between the output of one of the converters 49 and the input of one of the windings 51a, 51b, represented at the winding 51b, the signal u51b(t) which is supplied here is missing after the indicated point in time $t_F$, as is illustrated by FIG. 3, diagram (b) for this occurrence of a failure.

The modulated test signal ϵ' is evident in both failure cases, in two different amplitude representations, cf. in each case diagram (c) of FIGS. 3 and 4. The signal ϵ' shown here is the modulated signal ϵ that is modulated by the modulator 44. The two output signals u51a(t) and u51b(t) are shown as sine-cosine signals that are modulated by the modulator 44, in the time range around the failure case, cf. in each case diagrams (a) and (b) of FIGS. 3 and 4.

After the occurrence of the error case at the point in time $t_F$ the error signal F of the diagrams (f) as an output of the window comparator 38 switches to (logic) zero. Thus, the error signal F becomes a time-dependent signal F(t), if the time is the independent variable. The error case occurring in the example of FIGS. 3 and 4 at the point in time 120 msec is recognized practically immediately in the case of an interruption of the lead to the stator winding 51b due to the very high signal amplitude of the voltage u53(t). Also a missing signal ϵ' in FIG. 4, diagram (c), is recognized as an error case, only with a slight time delay of somewhat more than 4 msec due to the delay 32b provided in the circuit 30 and the given, very slight signal amplitude of the test signal at the output of the winding 53.

The error situations shown show that both errors in the stator and errors of leads to the stator and errors in the rotor or in leads from the rotor are detected. The feeding of the test signal ϵ not only to the circuit 40, but also to the test circuit 30 provides for this, where, upon the failure of the signal according to FIG. 4, diagram (c), it is decisive for causing the signal F to be switched in the case of a lack of compensation by the subtraction point 33. In the other error case according to FIG. 3, diagram (c), the high amplitude across the time delay 32b is decisive, which originates from the erratically greatly increasing signal u53(t) and influences the monitoring circuit 30.

The low pass 32b as a component of the filter 32 with the absolute-value formation 32a filters out high-frequency portions which are removed (in parallel) by the demodulation in the input portion 41 of the control arrangement 40. This smoothening 32b has an effect on a time delay up to the responding of F(t) with a given window comparator 38 and a given response threshold.

The higher the signal amplitude is, cf. FIG. 3, diagram (c), or with a lesser amplitude FIG. 4, diagram (c), the faster is the response of the error signal, F(t), in each case represented in FIGS. 3 and 4 in diagram (f).

Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

I claim:

1. A process for detecting an undesired operating condition associated with a sensor for a drive means comprising:
    coupling the sensor in a transformer manner between a stator side and a rotor side of said sensor;
    providing a control circuit coupled to said transformer-coupled sensor for detecting one of a position value and a rotational speed value of the drive means;
    providing an error signal (F) upon an occurrence of an undesired operating condition of the sensor; and
    supplying a test signal (ϵ) to a safety monitoring device and also to a control circuit, wherein the monitoring device is configured to determine and emit the error signal, wherein an operating signal ($u_{53}$) of the transformer-coupled sensor is supplied to both the safety monitoring device and the control circuit, and
    wherein the safety monitoring device influences the operating signal ($u_{53}$) initially in a functionally similar manner as the control circuit influences the operating signal, but separately thereof.

2. The process according to claim 1, wherein the undesired operating condition is a short circuit associated with the sensor or its connecting leads.

3. The process according to claim 1, wherein the test signal (ϵ) is substantially constant.

4. The process according to claim 1, wherein the test signal (ϵ) interferes at a point of the control circuit, located before at least one integrator.

5. The process according to claim 1, wherein the undesired operating condition is at least one of the following:
   (i) an excessive rotational speed;
   (ii) an exceeding of a predetermined limit speed;
   (iii) an electrical failure in the transformer-coupled sensor;
   (iv) an electrical failure in the area of connections or lead paths of the transformer-coupled sensor; and
   (v) a mechanical failure in the area of the transformer-coupled sensor.

6. The process according to claim 1, wherein the sensor is a signal transmitter for determining or calculating at least one operating signal of drive technology at the drive means, which is in particular designed as a synchro resolver or resolver.

7. The process according to claim 1, wherein the control circuit implements a servo control in order to calculate at least one rotational speed value ($\omega$) from the operating signal ($u_{53}$) and to emit it.

8. The process according to claim 1, wherein the separate influencing is independent of a corresponding influencing in the control circuit.

9. The process according to claim 1, wherein the separate influencing comprises an analog to digital conversion and a smoothening to suppress a high-frequency portion of the operating signal ($u_{53}$).

10. The process according to claim 9, wherein the influenced, smoothened operating signal is combined with the test signal ($\epsilon$) in a difference-generating fashion in order to obtain a difference signal ($u_{33}$).

11. The process according to claim 10, wherein a tolerance range ($\Delta u_{38}$) is compared with the difference signal ($u_{33}$) in order to emit the error signal (F; F(t)), if the difference signal leaves the tolerance range.

12. The process according to claim 1, wherein the transformer-coupled sensor is mounted on the shaft of the drive, in order to emit the operating signal ($u_{53}$) as the output signal of a transformer-induced winding mechanically coupled to the shaft irrespective of the rotation of the shaft.

13. The process according to claim 1, wherein the transformer-coupled sensor is a synchro resolver or resolver.

* * * * *

UNITED STATES PATENT AND TRADEMARK OFFICE
CERTIFICATE OF CORRECTION

PATENT NO. : 7,723,940 B2
APPLICATION NO. : 10/544931
DATED : May 25, 2010
INVENTOR(S) : Tinebor It is certified that error appears in the above-identified patent and that said Letters Patent is hereby corrected as shown below:

Please delete patent 7,817,739 in its entirety and insert patent 7,817,739 in its entirety as attached Signed and Sealed this
Twenty-seventh Day of March, 2012

David J. Kappos
*Director of the United States Patent and Trademark Office*

(12) United States Patent
Tinebor

(10) Patent No.: US 7,723,940 B2
(45) Date of Patent: May 25, 2010

(54) NON-REDUNDANT SAFETY MONITORING FOR AN ELECTRIC DRIVE MECHANISM (WITH A SENSOR)

(75) Inventor: Manfred Tinebor, Barntrup (DE)

(73) Assignee: Lenze Automation GmbH, Meerbusch (DE)

( * ) Notice: Subject to any disclaimer, the term of this patent is extended or adjusted under 35 U.S.C. 154(b) by 557 days.

(21) Appl. No.: 10/544,931

(22) PCT Filed: Feb. 10, 2004

(86) PCT No.: PCT/DE2004/000240
§ 371 (c)(1),
(2), (4) Date: Feb. 23, 2006

(87) PCT Pub. No.: WO2004/070924
PCT Pub. Date: Aug. 19, 2004

(65) Prior Publication Data
US 2006/0186891 A1 Aug. 24, 2006

(30) Foreign Application Priority Data
Feb. 10, 2003 (DE) .................. 103 05 337

(51) Int. Cl.
*G05B 23/02* (2006.01)

(52) U.S. Cl. .................. 318/565

(58) Field of Classification Search .......... 318/560, 318/563, 565, 568.24, 568.16, 700, 711, 318/714, 715; 324/527, 523
See application file for complete search history.

(56) References Cited

U.S. PATENT DOCUMENTS

| | | | |
|---|---|---|---|
| 5,635,810 A * | 6/1997 | Goel | 318/719 |
| 5,917,297 A * | 6/1999 | Gerster et al. | 318/366 |
| 6,191,550 B1 * | 2/2001 | Yoshihara | 318/661 |
| 6,199,422 B1 | 3/2001 | Boerhout et al. | |
| 6,208,536 B1 * | 3/2001 | Boesche et al. | 363/37 |
| 6,745,083 B2 * | 6/2004 | Eckardt et al. | 700/2 |
| 6,822,416 B1 * | 11/2004 | Kunz et al. | 318/700 |
| 6,832,121 B1 * | 12/2004 | Albrecht et al. | 700/79 |
| 6,906,492 B2 * | 6/2005 | Matsushita | 318/727 |
| 6,958,620 B1 * | 10/2005 | Kozuki | 324/772 |
| 7,012,399 B2 * | 3/2006 | Suzuki | 318/661 |
| 2002/0152039 A1 * | 10/2002 | Fujimoto et al. | 702/36 |
| 2002/0175645 A1 | 11/2002 | Fujimoto et al. | |

FOREIGN PATENT DOCUMENTS

| | | |
|---|---|---|
| EP | 0 264 350 | 10/1987 |
| WO | WO 99/29474 | 12/1998 |

OTHER PUBLICATIONS

International Search Report dated Oct. 4, 2004.

* cited by examiner

*Primary Examiner* — Bentsu Ro
*Assistant Examiner* — David S Luo
(74) *Attorney, Agent, or Firm* — Hunton & Williams, LLP

(57) ABSTRACT

The invention relates to a method for detecting undesired operating conditions of a driving device. A sensor (50) that is transformer-coupled between a stator side and a rotor side is triggered by a control circuit (40) for detecting a position value or a rotational speed value of the drive mechanism. An error signal (F) is emitted, if an undesired operating condition occurs. A test signal (ε) is supplied to a safety monitoring device (30) in order to determine and emit this error signal (F), said test signal being also supplied to the control circuit (40). There, the test signal (ε) acts as an unbalance and is checked as regards its presence in the safety monitoring device.

13 Claims, 4 Drawing Sheets

NON-REDUNDANT SAFETY MONITORING FOR AN ELECTRIC DRIVE MECHANISM (WITH A SENSOR)

CROSS REFERENCE TO RELATED APPLICATIONS

This application is a U.S. National Stage Application of International Application No. PCT/DE04/00240, filed Feb. 10, 2004, which claims the benefit of DE 103 05 337.9, filed on Feb. 10, 2003, the disclosures of which are incorporated by reference herein in their entireties. PCT/DE04/00240 designated the United States and was not published in English.

FIELD OF THE DISCLOSURE

The invention relates to a process for monitoring a drive mechanism that is in particular electrically driven and customarily consists of a driving motor, a shaft and an output coupled to the shaft. At least one measuring signal, mostly also several measuring signals, is and/or are required in such drive mechanisms, which are customarily designated as rotational speed, acceleration and position (or angle of rotation) in drive technology.

The invention relates both to a process for detecting an undesired operating condition and to a sensor that is secured against failure. Preferably, this sensor is a synchro resolver, which is customarily designated as resolver in drive technology. The resolver is a transformer-coupled sensor that emits a use signal from which at least one system signal relevant for drive technology can be determined.

BACKGROUND OF THE DISCLOSURE

As regards the technical functional principle the synchro resolver is a rotating (magnetic) transformer whose output voltage is in an unequivocal relationship with the position of its shaft. For this reason, synchro resolvers are suited as absolute angle transmitters with an angular range of more than 360°, cf. in this connection e.g. DE-C-196 35 040 (Litton), column 1, lines 15 to 20 and column 2, lines 9 to 13. While the referenced publication relates to the merely mechanical construction of the synchro resolver, cf. FIG. 2 thereof, the determination of the desired system magnitudes is also possible with DE-C 38 34 384 (Lenze). The latter publication describes a process and a circuit arrangement for generating digitized rotational speeds and information on angles of rotation by means of a synchro resolver. In this connection reference is made to FIG. 1 thereof. It shows a control circuit as a servo controller, with which an operating signal of the rotor winding of the resolver is supplied to the circuit arrangement which controls the actuating variable to zero with a controller. Then, the output of the controller corresponds to the rotational speed in the stationary state and its integral corresponds to the position (called "angular output" there).

In particular, in the case of a rough environment, but also during long-term use, it must be ensured that the drives do not adopt any inadmissible operating conditions, i.e. that they do not experience any rotational speeds that are too high, if e.g. the measuring element for the measurement of the rotational speed fails such as due to an electrical or mechanical defect in the rotary encoder. Mostly, such problems are solved in the prior art by means of redundance, namely by the use of several rotary encoders, which, then, allow a safety monitoring within the framework of a comparative measurement or a voter-basis decision (at least in the case of three sensors).

Some embodiments allow non-redundant safety, and provide this safety for operating signals in drive technology. No additional sensors for said operating signals are to be added and, nevertheless, a safety-oriented limitation of the rotational speed of a drive is provided to obtain high levels of protection.

SUMMARY OF THE INVENTION

According to an embodiment of the invention, a sensor is of a reliable safety providing the generation of an error signal via a monitoring circuit possible, a non-admissible operating condition being detected and the error signal being accordingly generated.

The process is used in the general field of drive technology, alternatively a sensor according to the same claim, an unbalance signal being used which is fed to the closed control loop of the sensor. This continuous feeding of the unbalance signal can be detected outside the measuring loop in a separate monitoring circuit, where its presence is monitored and the error signal is accordingly emitted if this unbalance signal—called control signal in the monitoring circuit—fails to appear. The output signal of the sensor is also supplied to the monitoring circuit, which is supplied to the closed control circuit in the same fashion, this operating signal being, however, part of the closed control loop. Only the monitoring circuit is outside the closed control loop and is not included in the ascertaining of the automatic control signal with its output signal.

All electric defects of the selsyn and its connecting lead such as interruption or short circuit are detected with this special monitoring and the error signal is accordingly generated.

The monitoring circuit assumes the recognition of the failure, a test signal being fed near the servo control circuit of the circuit arrangement of the synchro resolver in the case of the use of a transformer-coupled sensor in the sense of the "synchro resolver". The insertion of the test signal can take place in particular at the place of the deviation, i.e. before the controller of the servo circuit that has at least one integral portion. Thus, this test signal influences the entire control circuit and, figuratively speaking, represents an unbalance, if one proceeds from the assumption that, in the stationary condition, a deviation of zero is present at the input of the controller of the circuit arrangement. This stationary deviation is still present, it is only influenced by the feeding of the test signal which, in turn is supplied to the monitoring circuit in the same fashion (with the same amplitude).

If there is a failure of the synchro resolver, the safety monitoring can recognize that a control signal of zero is not obtained, if the unbalance signal is subtracted. This allows the conclusion that there is an electrical or mechanical defect of the sensor, which results in a safety shutdown, which is caused at a low voltage level. The presence of the test signal is continuously monitored in the safety monitoring device. In this connection, the test signal may be substantially constant. It may be fed as an angular signal, specifically at the aforementioned place of the deviation of the integral controller of the servo control.

Not only the test signal is fed both to the safety monitoring device and to the servo control, but the output signal (operating signal) of the resolver is fed thereto, as well.

Examples of failures to be recognized are a limit rotational speed monitoring (claim 7).

The determination of the rotational speed value or the position value in the servo control takes place as explained in the prior art section Since the test signal is first of all filtered out from the modulated operating signal of the synchro resolver in the safety monitoring device and no special demodulation in the safety monitoring device must be carried out for this purpose as it is carried out in servo control by means of a carrier frequency, the high frequency portion of the operating signal can be filtered out by means of a simple circuit technology. In this connection reference must be made to the fact that the functionality which is used in the initial portion of servo control and that used in safety monitoring device should be comparable.

The control signal obtained by the functionally equal influencing by the signal should essentially correspond to the test signal in the normal condition of the drive as regards the absolute value so that a subtractive combination (in the sense of a comparison of the absolute-value variables) results in a result of zero.

If there is a deviation that is longer in terms of time or higher in terms of the absolute value, the error signal can be generated. In order to detect error signals on a not too sensitive basis, a tolerance range may be provided, e.g. by means of a window comparator. There may also be a time-out, before the error signal is activated.

It must be noted that the error signals to be detected are not such signals which can be "detected by means of control engineering and adjusted". Such disturbing influences that can be detected in this fashion should be detected by the regular control, whereas the "disturbance variables" in the sense of safety-relevant failures which cannot be influenced by this control are separately detected by the safety monitoring device.

In order to keep the influence by the test signal deterministic, this signal should be at least continuous, in particular formed as a constant value. It is certainly fed into the control circuit, but, if its magnitude is known, it can be taken into account in the actual control. Since it is deterministic and its amplitude is known, it can also be subtractively combined in the safety monitoring device, the safety monitoring device separately determining this test signal as an unbalance of the deviation of the servo controller in the sense of a control signal.

The modulation signal used in the servo control (the control circuit) may be in the range of 4 to 6 kHz, in particular as a sinusoidal signal in order to obtain a higher resolution due to a sampling of the shape of this signal and/or the wave shape. Within one sinusoidal oscillation sampling is e.g. carried out 8 times, which is in particular of advantage in the case of slow rotational speeds.

The use of the unbalance signal (also: test signal) for recognizing short circuits in the connecting leads, the connecting points or the winding of the sensor is advantageous. An interruption could at best be detected with an impressed one-polarity signal (Gleichsignal) in the sensor which does not have any influence on the measuring variable due to the transformer coupling, but not a short circuit which would leave the DC current signal at the sensor practically unchanged. The most frequent causes of trouble are defective cables and connections, which can be recognized with the invention irrespective of the type of the defect associated with the sensor.

The invention provides safety without additional redundance of rotary transducers. Accordingly, just one such safety-monitored sensor, e.g. as a synchro resolver, may be used for a drive application. The use of further such sensors is not excluded, if this is required by the field of application.

The safety monitoring device first of all covers the rotary transducer itself, however, with the monitoring of this rotary transducer, the safety of the drive as a whole and of the object driven by the drive is also monitored. Monitoring is effected on a low potential level, i.e. close to the control voltage, not on the power side.

According to the invention costs can be reduced by saving further redundant transducers. Assembly expenditure can be avoided and, nevertheless, safety can be obtained.

BRIEF DESCRIPTION OF THE DRAWINGS

FIG. 1 illustrates a block diagram of a first example;

FIG. 2 illustrates an overview diagram to explain the test signal $\epsilon$;

FIG. 3 shows signal waveforms (a) to (f) with the first example for various error conditions that are detected;

FIG. 4 shows signal waveforms (a) to (f) with the first example for various error conditions that are detected.

Examples explain and supplement the invention.

DETAILED DESCRIPTION OF THE DISCLOSURE

The following description is intended to convey a thorough understanding of the embodiments described by providing a number of specific embodiments and details involving non-redundant safety monitoring of a sensor for an electric drive. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

FIG. 2 illustrates a schematic overview of the functional units of the safety monitoring device described here. A synchro resolver (resolver) 50 is used as a sensor, which is coupled to the shaft of the drive. The synchro resolver comprises transformer-coupled windings, one of which co-rotates with the shaft, whereas the two other windings are associated to the stator and are supplied with two alternating signals by a control circuit 40. The phase position of these alternating signals is to correspond to the position and/or the rotary position $\alpha$ of the drive. For this purpose, the servo control 40 is provided with an integrator as a controller, which adjusts an actuating variable to zero, which condition stipulates that the phase position of the signal at the output of the servo control corresponds to the position of the drive.

Thus, a closed control loop is characterized with the functional units 40, 50. The operating signal $u_{53}$ of the resolver, i.e. the signal induced on the rotor winding is also fed to a safety monitoring device 30 from the control loop, whose innards will be explained below by means of FIG. 1. This safety monitoring device emits an error signal F which characterizes a condition which should not occur during normal operation of the drive. It may characterize a failure of the mechanical or electrical parts of the synchro resolver, it may also register an excessive rotational speed and result in a switching off.

An unbalance signal in the sense of a separate, substantially stationary signal $\epsilon$ is supplied both to the control circuit 40 with the servo control and to the safety monitoring device 30. Thus, this signal is fed to the control loop, on the one hand, and, on the other, it is also used outside the control loop in a known amount. This equality of the signals can be used for using the unbalance signal $\epsilon$ as a comparative signal (test signal) which is compared with a control signal derived from the useful signal $u_{53}$ (as operating signal of the resolver 50) in the monitoring circuit 30.

The more detailed embodiment is shown in FIG. 1. Here, as well, the described functions are found again, only in a specific implementation. The implementation can either be analog or digital in circuit technology. The corresponding components can be implemented discretely or through microprocessor technology. Custom-designed components may also be used, on which analog-to-digital converters are placed, tables for reading out a sinusoidal curve are deposited and the corresponding control algorithms are carried out in sampling control.

Proceeding from the schematically represented selsyn 50 with its rotating rotor winding 53 and the operating signal $u_{53}$ emitted by it this signal is supplied both to the control circuit 40 and the monitoring circuit 30. The two stator windings 51a, 51b that do not have the same orientation (are staggered with respect to each other) are fed by an output stage 49, which makes two phase-shifted signals available. Here, they are designated as cosine and sine, if two windings are provided in the selsyn 50.

A servo controller 42 is provided as a PI controller in the servo control. It has at least one integral-action component in order to provide for a deviation of zero. This deviation results from the physics of the resolver as a first approximation to the difference of the phase positions α and φ, more accurately as the sine of this difference. If the deviation can be controlled to zero, the angle α corresponds to the angle φ. Thus, the position determination of the drive is possible. A rotational speed designated as ω(t) is measured upstream of an angular integrator 43. In the measuring principle chosen here, the position results from an integration of the rotational speed.

Proceeding from the rotational position ω(t) two oscillation curves $u_{51a}(t)$ and $u_{51b}(t)$ that are phase shifted by 90° can first of all be formed in a digital and then in an analog fashion by means of tables, which form the control signals for the two stator windings 51a, 51b.

Both the output portion of the control circuit, called actuating portion 49, and the input portion 41 of the circuit arrangement 40 use a carrier frequency signal emitted by a generator 44. This signal serves for demodulation in the input portion, whereas it is used for modulating the two phase-shifted output signals in the output portion. A sinusoidal oscillation is used as the carrier frequency, which enables an increased resolution of the position signal of up to 21 bits, instead of substantially 16 bits as has been the case so far, if a digital carrier frequency signal is used. With the modulation in the output portion (before the a-d converters) a resolution of the output signal $u_{53}$ of the sensor can also be made possible in the case of slow rotational speeds up to a standstill. The modulation provides for a transformer-induced signal transmission even if there is no relative movement of the three windings (two in the stator, one in the rotor). Different numbers of windings (e.g. three windings in the stator as a three-phase system) can also be used.

A test signal ε, which was explained above, interferes with the control loop. This test signal is inserted before the at least one integrator 42, 43, in this case at the actuating variable in such a way that the actuating variable is unbalanced and/or adjusted. An influence at this point results in that the servo controller still sets the value zero for the stationary condition at the now changed actuating variable. The dynamics of the system is not influenced by this, only a change in the position measurement takes place. This change in position due to the interference of the test angle ε as a stationary signal can be detected in the safety monitoring device 30. For this purpose, the operating signal $u_{53}$ is supplied to the safety monitoring device. An a-d conversion 31 takes place. After this, the signal is filtered, the filter 32 consisting in the example of an absolute-value generation 32a and a low pass 32b. The low pass 32b filters out the high-frequency portions, which are taken out by the demodulation in the input portion 41 of the control arrangement 40 and/or inserted by the modulation in the actuating portion 49 of the circuit arrangement 40 for the purposes indicated above. Due to the absolute-value generation 32 it is ensured that the drive can be safety-monitored in both directions.

After filtering, a control variable results as a control signal $U_{32}$ which is compared with the test signal ε in a comparator circuit 33. The comparison may be a summation (with an opposite sign). In other words, the test signal as the unbalance signal and the control signal are "subtractively combined".

A signal $U_{33}$ results as a differential signal. This signal should amount to substantially zero in the case of the perfect condition of the drive and without failures of the synchro resolver 50. Slight excursions in the case of dynamic actuating operations and slight deviations regarding the amplitude are possible so that an error signal F is detected by means of a window comparator 38 which does not react too sensitively.

This error signal F can either be compared in the amplitude with a span $\Delta u_{38}$, within which it is not generated, e.g. by the window comparator 38. It may also be combined with a timing circuit (not shown) in such a way that an error signal is only actively output if the measured error signal $u_{33}$ is present for a given (minimum) period of time. This operating mode can be considered as a "short-term blocking".

Known drives and outputs are not represented, which a person skilled in the art will analogously supplement so that they are brought into a suitable mechanical connection with the synchro resolver. The actual control with which the drive is driven starting from the rotational variables indicated in FIG. 1 such as the rotational speed or the position, supplementarily possibly also a measured acceleration, is also not represented.

As an example the shape of test signal is represented here as a stationary test angle ε=constant, which influences the control circuit on a long-term basis. It is not adjusted by the actual control of the drive.

It was compared above that the operating signal $u_{53}$ is treated functionally equal in the input portion of the control circuit 40 and in the input portion of the safety monitoring device 30. As regards the result, the actual actuating variable prior to the influencing by the test angle ε, i.e. before the summing point 42a, is zero in the stationary condition. Thus the two input portions are functionally equal even if they are differently designed in terms of circuit technology.

Since the summing point 42a works as a difference generator 33 in the safety monitoring device, it can be recognized that no signal component should be present both at the window comparator 38 (difference signal $u_{33}$) and at the input of the servo controller 42 in the stationary condition. This is different for the undesired operating condition to be detected. It is true that the servo controller will still adjust an actuating variable to zero for a certain period of time, but here, the window comparator already responded and indicates an undesired operating condition through the error signal F, also called F(t), F(t) being 0, if t>$t_F$, with $t_F$ being the point in time of the occurrence of the failure in an example.

This comparison reveals that, independently of the servo control 40, an independent influencing of the operating test signal $u_{53}$ takes place in order to be able to monitor the presence of the test angle to be evaluated as regards the amplitude. The occurrence of an error to be detected results from the lack of compensation in the safety monitoring device 30 which is represented with a time delay or with a certain amplitude tolerance $\Delta u_{38}$ as error signal F(t).

In other words, the output of the error signal F occurs in the case of a deviation and/or if the compensation case is left in the safety monitoring device. The compensation case is the condition with a synchro resolver 50 that is duly connected electrically and mechanically and functions properly. This compensation case must not be a complete compensation of the signals at the subtraction point 33, but may be "substantially a compensation" as this results form the description of the tolerance voltage and the time monitoring prior to a definitive output of the error signal F.

Signal diagrams for the example of embodiment will be explained in the following. They are allocated to three points in the circuit diagram of FIG. 1. The two output signals u51a(t) and u51b(t) are signals with a carrier frequency, which are modulated by the modulator 44. This carrier frequency can only be recognized in outlines in the sampled signal, whereas the envelope represents the rotational frequency of the rotor. These two frequencies are clearly different; the modulation signal used in the servo control may be in the range of 4 to 6 kHz (cf. page 4, last paragraph).

The test signal ε that is assumed to be constant in the example is modulated by the carrier frequency of the modulator 44 as signal ε' that is small as regards the amplitude and can be recognized at u53, in this example with a small amplitude of less than 200 mV.

For the occurrence of an error to be assumed, FIGS. 3 and 4 show different errors, once with the stator (FIG. 3) and once with the rotor (FIG. 4). Inasmuch as the rotor is affected, a modification of conductance of the rotor winding 53 is concerned, which occurs due to an interruption or a short circuit at the assumed point in time $t_F$. In the represented example this is the case at the point in time 120 msec. This applies to the two FIGS. 3 and 4. In the case of an interruption of the wiring arrangement between the output of one of the converters 49 and the input of one of the windings 51a, 51b, represented at the winding 51b, the signal u51b(t) which is supplied here is missing after the indicated point in time $t_F$, as is illustrated by FIG. 3, diagram (b) for this occurrence of a failure.

The modulated test signal ε' is evident in both failure cases, in two different amplitude representations, cf. in each case diagram (c) of FIGS. 3 and 4. The signal ε' shown here is the modulated signal ε that is modulated by the modulator 44. The two output signals u51a(t) and u51b(t) are shown as sine-cosine signals that are modulated by the modulator 44, in the time range around the failure case, cf. in each case diagrams (a) and (b) of FIGS. 3 and 4.

After the occurrence of the error case at the point in time $t_F$ the error signal F of the diagrams (f) as an output of the window comparator 38 switches to (logic) zero. Thus, the error signal F becomes a time-dependent signal F(t), if the time is the independent variable. The error case occurring in the example of FIGS. 3 and 4 at the point in time 120 msec is recognized practically immediately in the case of an interruption of the lead to the stator winding 51b due to the very high signal amplitude of the voltage u53(t). Also a missing signal ε' in FIG. 4, diagram (c), is recognized as an error case, only with a slight time delay of somewhat more than 4 msec due to the delay 32b provided in the circuit 30 and the given, very slight signal amplitude of the test signal at the output of the winding 53.

The error situations shown show that both errors in the stator and errors of leads to the stator and errors in the rotor or in leads from the rotor are detected. The feeding of the test signal ε not only to the circuit 40, but also to the test circuit 30 provides for this, where, upon the failure of the signal according to FIG. 4, diagram (c), it is decisive for causing the signal F to be switched in the case of a lack of compensation by the subtraction point 33. In the other error case according to FIG. 3, diagram (c), the high amplitude across the time delay 32b is decisive, which originates from the erratically greatly increasing signal u53(t) and influences the monitoring circuit 30.

The low pass 32b as a component of the filter 32 with the absolute-value formation 32a filters out high-frequency portions which are removed (in parallel) by the demodulation in the input portion 41 of the control arrangement 40. This smoothening 32b has an effect on a time delay up to the responding of F(t) with a given window comparator 38 and a given response threshold.

The higher the signal amplitude is, cf. FIG. 3, diagram (c), or with a lesser amplitude FIG. 4, diagram (c), the faster is the response of the error signal, F(t), in each case represented in FIGS. 3 and 4 in diagram (f).

Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

I claim:

1. A process for detecting an undesired operating condition associated with a sensor for a drive means comprising:
   coupling the sensor in a transformer manner between a stator side and a rotor side of said sensor;
   providing a control circuit coupled to said transformer-coupled sensor for detecting one of a position value and a rotational speed value of the drive means;
   providing an error signal (F) upon an occurrence of an undesired operating condition of the sensor; and
   supplying a test signal (ε) to a safety monitoring device and also to a control circuit, wherein the monitoring device is configured to determine and emit the error signal, wherein an operating signal ($u_{53}$) of the transformer-coupled sensor is supplied to both the safety monitoring device and the control circuit, and
   wherein the safety monitoring device influences the operating signal ($u_{53}$) initially in a functionally similar manner as the control circuit influences the operating signal, but separately thereof.

2. The process according to claim 1, wherein the undesired operating condition is a short circuit associated with the sensor or its connecting leads.

3. The process according to claim 1, wherein the test signal (ε) is substantially constant.

4. The process according to claim 1, wherein the test signal (ε) interferes at a point of the control circuit, located before at least one integrator.

5. The process according to claim 1, wherein the undesired operating condition is at least one of the following:
   (i) an excessive rotational speed;
   (ii) an exceeding of a predetermined limit speed;
   (iii) an electrical failure in the transformer-coupled sensor;
   (iv) an electrical failure in the area of connections or lead paths of the transformer-coupled sensor; and
   (v) a mechanical failure in the area of the transformer-coupled sensor.

6. The process according to claim 1, wherein the sensor is a signal transmitter for determining or calculating at least one operating signal of drive technology at the drive means, which is in particular designed as a synchro resolver or resolver.

7. The process according to claim 1, wherein the control circuit implements a servo control in order to calculate at least one rotational speed value ($\omega$) from the operating signal ($u_{53}$) and to emit it.

8. The process according to claim 1, wherein the separate influencing is independent of a corresponding influencing in the control circuit.

9. The process according to claim 1, wherein the separate influencing comprises an analog to digital conversion and a smoothening to suppress a high-frequency portion of the operating signal ($u_{53}$).

10. The process according to claim 9, wherein the influenced, smoothened operating signal is combined with the test signal ($\epsilon$) in a difference-generating fashion in order to obtain a difference signal ($u_{33}$).

11. The process according to claim 10, wherein a tolerance range ($\Delta u_{38}$) is compared with the difference signal ($u_{33}$) in order to emit the error signal (F; F(t)), if the difference signal leaves the tolerance range.

12. The process according to claim 1, wherein the transformer-coupled sensor is mounted on the shaft of the drive, in order to emit the operating signal ($u_{53}$) as the output signal of a transformer-induced winding mechanically coupled to the shaft irrespective of the rotation of the shaft.

13. The process according to claim 1, wherein the transformer-coupled sensor is a synchro resolver or resolver.

* * * * *